(12) United States Patent
Monshizadeh et al.

(10) Patent No.: US 10,986,067 B2
(45) Date of Patent: Apr. 20, 2021

(54) ANOMALY DETECTION IN SOFTWARE DEFINED NETWORKING

(71) Applicant: Nokia Solutions and Networks Oy, Espoo (FI)

(72) Inventors: Mehrnoosh Monshizadeh, Espoo (FI); Vikramajeet Khatri, Espoo (FI); Kimmo Kalervo Hatonen, Helsinki (FI); Aapo Kalliola, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 338 days.

(21) Appl. No.: 16/323,829

(22) PCT Filed: Jul. 3, 2017

(86) PCT No.: PCT/EP2017/066432
§ 371 (c)(1),
(2) Date: Feb. 7, 2019

(87) PCT Pub. No.: WO2018/028881
PCT Pub. Date: Feb. 15, 2018

(65) Prior Publication Data
US 2019/0215305 A1    Jul. 11, 2019

(30) Foreign Application Priority Data
Aug. 10, 2016 (EP) .................................. 16183515

(51) Int. Cl.
*H04L 29/06* (2006.01)
*H04W 12/121* (2021.01)
(Continued)

(52) U.S. Cl.
CPC ...... *H04L 63/0236* (2013.01); *H04L 63/1416* (2013.01); *H04L 63/1425* (2013.01);
(Continued)

(58) Field of Classification Search
None
See application file for complete search history.

(56) References Cited

U.S. PATENT DOCUMENTS

2012/0033581 A1* 2/2012 Torres Ramon ........ H04L 47/26
370/253
2015/0026794 A1* 1/2015 Zuk ......................... H04L 69/22
726/13
(Continued)

FOREIGN PATENT DOCUMENTS

| CN | 104468636 A | 3/2015 |
|---|---|---|
| CN | 104580173 A | 4/2015 |
| CN | 105162759 A | 12/2015 |

*Primary Examiner* — Andrew J Steinle
(74) *Attorney, Agent, or Firm* — Harrington & Smith

(57) ABSTRACT

A network apparatus of a communication system classifies traffic flows containing packets based on packet features. The network apparatus provides a copy of a packet contained in a traffic flow to a cluster node, and controls the cluster node to select at least one detector node based on the features of the packet and to forward said copy to the selected detector node to find out based on said copy whether the packet is malicious or not. In response to receiving from the detector node a flow indication on the traffic flow, the network apparatus controls a switch node to perform at least one flow control action on the traffic flow, the action including one or more of flow removal, flow modification and flow installation.

16 Claims, 11 Drawing Sheets

(51) Int. Cl.
*H04W 12/122* (2021.01)
*H04W 28/10* (2009.01)

(52) U.S. Cl.
CPC ....... *H04W 12/121* (2021.01); *H04W 12/122* (2021.01); *H04W 28/10* (2013.01)

(56) References Cited

U.S. PATENT DOCUMENTS

2016/0036635 A1    2/2016  Chao et al.
2016/0191545 A1    6/2016  Nanda et al.
2017/0155668 A1*   6/2017  Bartos ................ H04L 63/0236

* cited by examiner

ANOMALY DETECTION IN SOFTWARE DEFINED NETWORKING

CROSS REFERENCE TO RELATED APPLICATION

This patent application is a U.S. National Stage application of International Patent Application Number PCT/EP2017/066432 filed Jul. 3, 2017, which is hereby incorporated by reference in its entirety, and claims priority to EP 16183515 filed Aug. 10, 2016.

TECHNICAL FIELD

The invention relates to communications.

BACKGROUND

New network technologies such as cloud computing bring new security challenges. In a cloud computing infrastructure, security threats and their detection and prevention mechanisms are almost similar to those of conventional networks. However, applying these mechanisms to new elements such as software defined networking (SDN) and network functions virtualization (NFV) is a challenge. While different solutions such as security zones and grouping, isolating applications by virtual machines (VM) and licensing may be used for these elements, intrusion detection system (IDS) are still required in the network as a defence solution. IDS monitors network traffic in real time and compares received packet patterns with known patterns to detect anomalies in the network traffic.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following the invention will be described in greater detail by means of preferred embodiments with reference to the accompanying drawings, in which.

DETAILED DESCRIPTION OF SOME EMBODIMENTS

Figure 1:
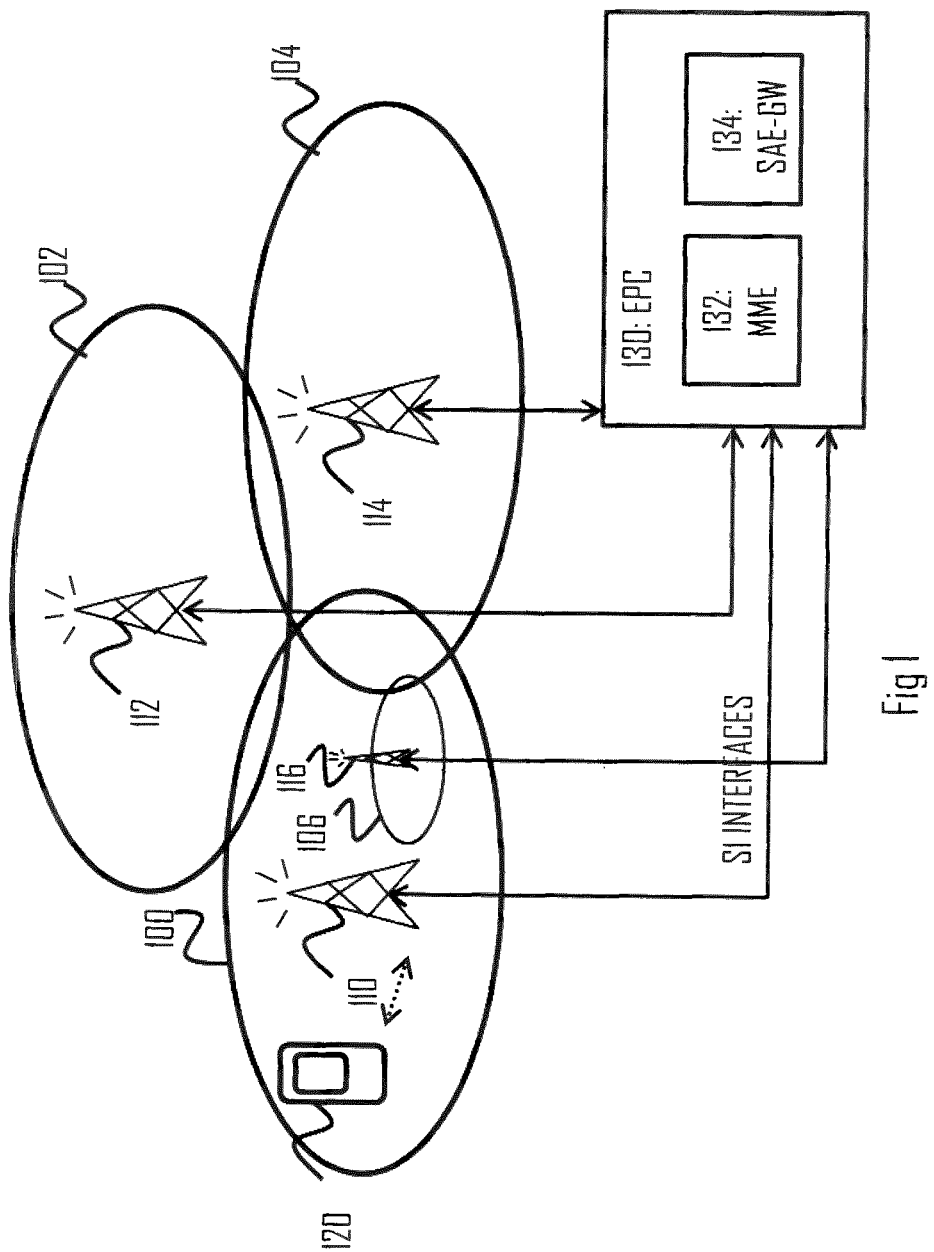
FIG. 1 illustrates a wireless communication system to which embodiments of the invention may be applied.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Embodiments described may be implemented in a radio system, such as in at least one of the following: universal mobile telecommunication system (UMTS, 3G) based on basic wideband-code division multiple access (W-CDMA), high-speed packet access (HSPA), long term evolution (LTE), LTE-advanced, and/or 5G system. The present embodiments are not, however, limited to these systems.

The embodiments are not, however, restricted to the system given as an example but a person skilled in the art may apply the solution to other communication systems provided with necessary properties. One example of a suitable communications system is the 5G system, as listed above. It is assumed that network architecture in 5G will be quite similar to that of the LTE-advanced. 5G is likely to use multiple input-multiple output (MIMO) antennas, many more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent. Some other technology advancements probably to be used are software-defined networking (SDN), big data, and all-IP, which may change the way networks are being constructed and managed.

FIG. 1 illustrates an example of a cellular communication system to which embodiments of the invention may be applied. Cellular radio communication networks, such as the long term evolution (LTE), the LTE-advanced (LTE-A) of the 3rd generation partnership project (3GPP), or the predicted future 5G solutions, are typically composed of at least one network element, such as a network element 110, providing a cell 100. Each cell may be, e.g. a macro cell, a micro cell, femto, or a pico cell, for example. The network element 110 may be an evolved node-B (eNB) as in the LTE and LTE-A, or any other apparatus capable of controlling radio communication and managing radio resources within a cell. For 5G solutions, the implementation may be similar to LTE-A, as described above. The network element 110 may be called a base station or an access node. The cellular communication system may be composed of a radio access network of network elements 110, 112, 114, e.g. eNBs, each controlling a respective cell or cells 100, 102, 104. The network elements 110 to 114 may each control a macro cell 100 to 104 providing wide area coverage for terminal devices 120. The network elements 110 to 114 may also be called access nodes because they provide the terminal devices 120 with wireless access to other networks such as the internet. Additionally, one or more local area access nodes 116 may be arranged within a control area of a network element 110, 112, 114 controlling a macro cell, 100 to 104. The local area access node 116 may provide wireless access within a sub-cell 106 that may be comprised within a macro cell 100. Examples of the sub-cell may include a micro, pico and/or femto cell. Typically, the sub-cell provides a hot spot within a macro cell. The operation of the local area access node 116 may be controlled by a network element 110 under whose control area the sub-cell is provided. The network element 110 and the other network elements 112 to 116 may support dual connectivity (DC) in which the terminal device 120 has established multiple connections with cells associated with a master eNB network element and a secondary eNB network element.

The network element 110 may employ carrier aggregation in which the terminal device 112 is allocated with resources from a plurality of component carriers that may be on contiguous frequency bands or on non-contiguous frequency bands. One network element 110 may provide one component carrier, e.g. a primary component carrier, while another network element 116 may provide another component carrier, e.g. a secondary component carrier. The network element 110 operating the primary component carrier may carry out scheduling of resources on all component carriers, or each network element 110, 116 may control scheduling of the component carrier it operates. Alternatively network element 110 may provide one component carrier, e.g. a primary component carrier, as well as another component carrier, e.g. a secondary component carrier.

In the case of multiple eNBs in the communication network, the eNBs may be connected to each other with an X2 interface as specified in LTE. Other communication methods between the network elements may also be possible. The network elements 110 to 116 may be further connected via an S1 interface to an evolved packet core (EPC) 130, more specifically to a mobility management entity (MME) 132 and to a system architecture evolution gateway (SAE-GW) 134.

The radio system of FIG. 1 may support machine type communication (MTC). MTC may enable providing service for a large amount of MTC capable devices, such as the at least one terminal device 120. The at least one terminal device 120 may comprise mobile phones, smart phones, tablet computers, laptops and other devices used for user communication with the radio communication network, such as a MTC network. These devices may provide further functionality compared to the MTC scheme, such as communication link for voice, video and/or data transfer. However, in MTC perspective the at least one terminal device 120 may be understood as a MTC device. The at least one terminal device 120 may also comprise another MTC capable device, such as a sensor device providing position, acceleration and/or temperature information to name a few examples.

IDS devices are designed to handle network traffic in real time; yet the cost and high processing time is a challenge for handling the traffic load. Combining dynamicity and programmability of SDN together with traffic filtering of IDS, enables a scalable, redundant and reliable anomaly detection for mobile network operators.

The mobile network is evolving towards cloud computing with programmable and adaptive characteristics. That brings additional security challenges and increases security attack surface. Due to the programmability of SDN, if attackers gain access to an SDN controller, then the whole network may be exploited by the attackers. The attackers may change forwarding paths and pass malicious traffic to infect the SDN enabled network. To detect the security attacks and malicious traffic early enough and to protect the network, centralized monitoring and IDS monitoring may be used for enhancing SDN, NFV and OpenFlow security. If the network traffic is analysed and the anomalies are detected, the SDN controller may be used to block such traffic from passing through the network by flow control, i.e. forwarding paths in a switch. IDS and IPS may be deployed at a gateway node to detect a security intrusion. Thus, the data traffic originated from a subscriber passes through each network element until the traffic reaches the gateway node. Such traffic may attack the network elements and may also cause a denial of service (DoS) attack in the network.

A prior art network security defence system has been suggested to be based on the software defined networking and involves a distributed denial of service (DDoS) scenario and be based on sampling. The system comprises an SDN controller, an IDS decision making server and an IDS device. The IDS device samples and detects suspicious traffic. Upon detection of the suspicious traffic, the IDS device informs an IDS server, and the IDS server prepares an action plan based on the type of anomaly in the traffic. The action plan made by the IDS server is sent to the SDN controller for threat processing. This way it reduces the load on the SDN controller for analysis. The SDN controller samples the packets for analysis, and involves scenarios such as ICMP flooding and UDP flooding.

A prior art network security traffic platform has been suggested to be based on a software definition and refers to a security platform on software level. The platform comprises of an application layer, a management layer and a data layer. The application layer comprises a network application, network services and a custom application interface. The management layer includes the SDN controller, whereas the data layer includes a firewall, a web application protective system and IDS that detect unsafe traffic. The SDN controller updates a custom firewall security policy to block unauthorized access.

A prior art network intrusion prevention system (IPS) has been suggested to comprise an IDS module which analyses and detects threats. Upon detection, the IDS module updates an IPS module about the threats, and the IPS module takes necessary mitigation actions. The IPS module utilizes SDN technology.

The software defined network has been suggested to be secured via flow deflection in a data centre environment. The conditions for flow deflection include overuse of computing resources including a central processing unit (CPU) and ternary content-addressable memory (TCAM). The resources are monitored, and upon detection of overuse, the flow deflection is enabled directing flows from one network element to another network element to avoid failures in SDN. When resources are not overloaded, the flows are deflected back to a network element. The aim is to reduce load in the SDN controller and computing resources, and to decide to which network element (i.e. switch) flows are to be forwarded. SDN is simply protected from being overloaded and avoids being a target of resource over-utilization attacks.

Conventional IDS and IPS have been suggested to be deployed in the gateway node and be utilized to detect the intrusion. But still the traffic passes through the network if the traffic originated from the mobile subscriber and is destined towards the internet.

Figure 2:
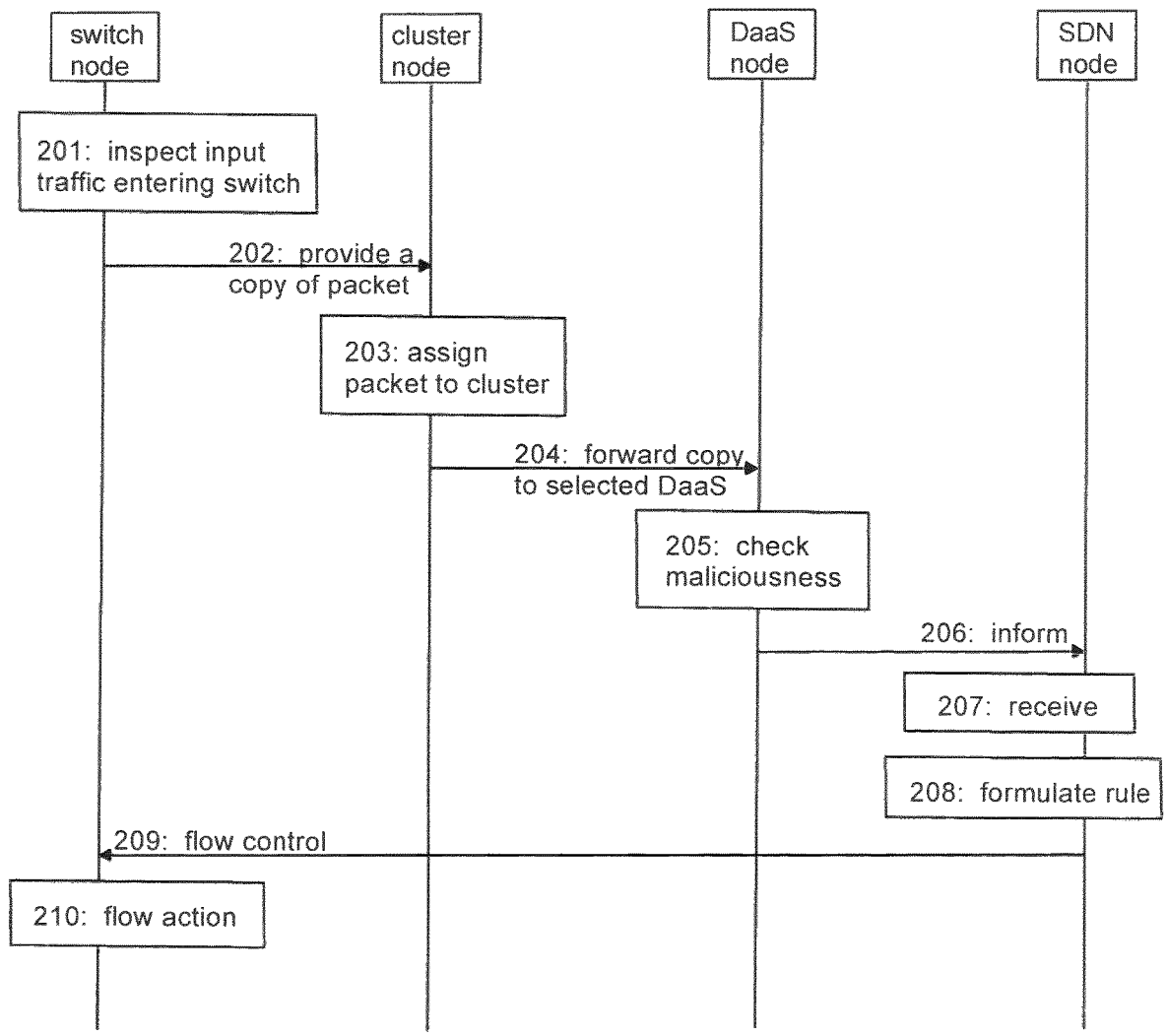
FIGS. 2 and 3 illustrate signalling diagrams of a procedure for anomaly detection according to an embodiment of the invention.
Figure 3:
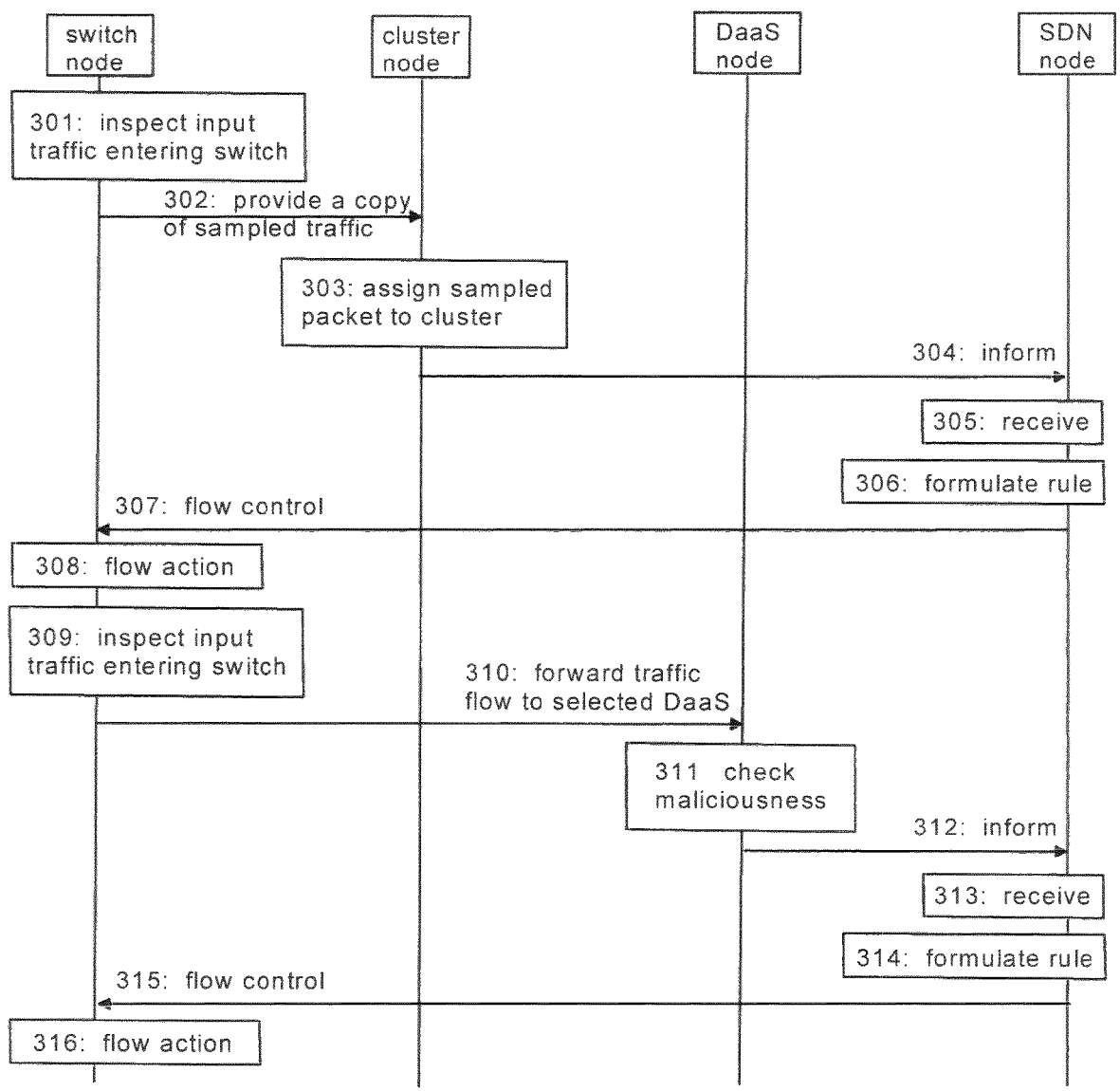

FIGS. 2 and 3 illustrate embodiments for anomaly detection between network elements, e.g. core network elements such as a switch node, cluster node, detector node and control node, of a communication system.

Referring to FIG. 2, in a first embodiment, input traffic entering a switch node is inspected (block 201) in the switch node. During the inspection, a forwarding table of the switch node may be checked in order to decide whether to pass a traffic flow or drop the traffic flow. If the traffic flow is safe, the switch node provides (block 202) a copy of a packet contained in the traffic flow to a cluster node. The cluster node selects (block 203) at least one detector node (DaaS node) based on the features of said copy. Said copy is forwarded (block 204) from the cluster node to the selected DaaS node among one or more DaaS nodes. The DaaS node checks (block 205) whether the said copy is malicious or not. If said copy is malicious, the DaaS node indicates (block 206) the corresponding traffic flow to a control node. The control node may be an SDN node comprising an SDN controller and/or an SDN application (SDN orchestrator).

Figure 4:
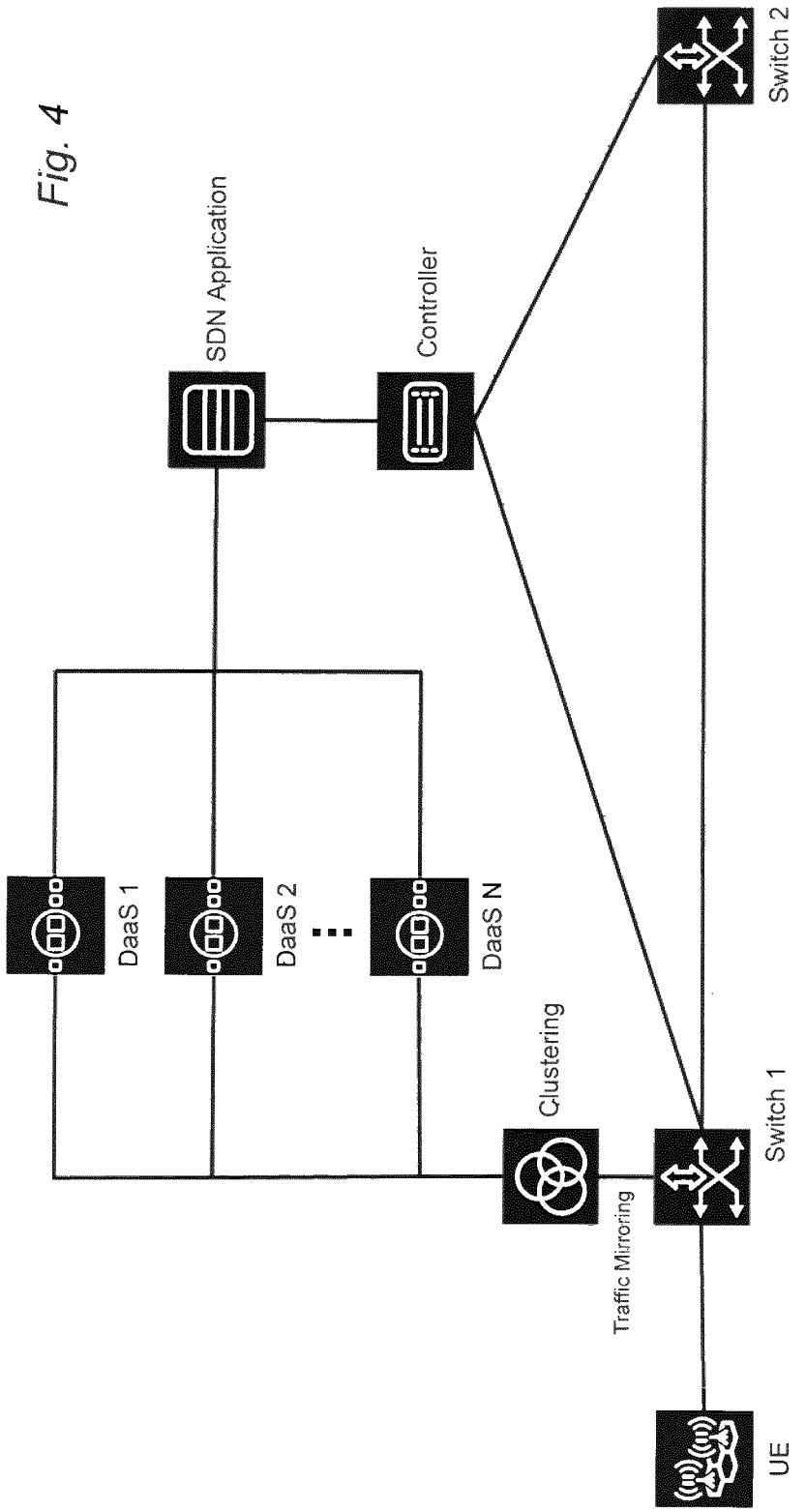
FIG. 4 is a schematic chart illustrating anomaly detection according to a first exemplary embodiment.
Figure 5:
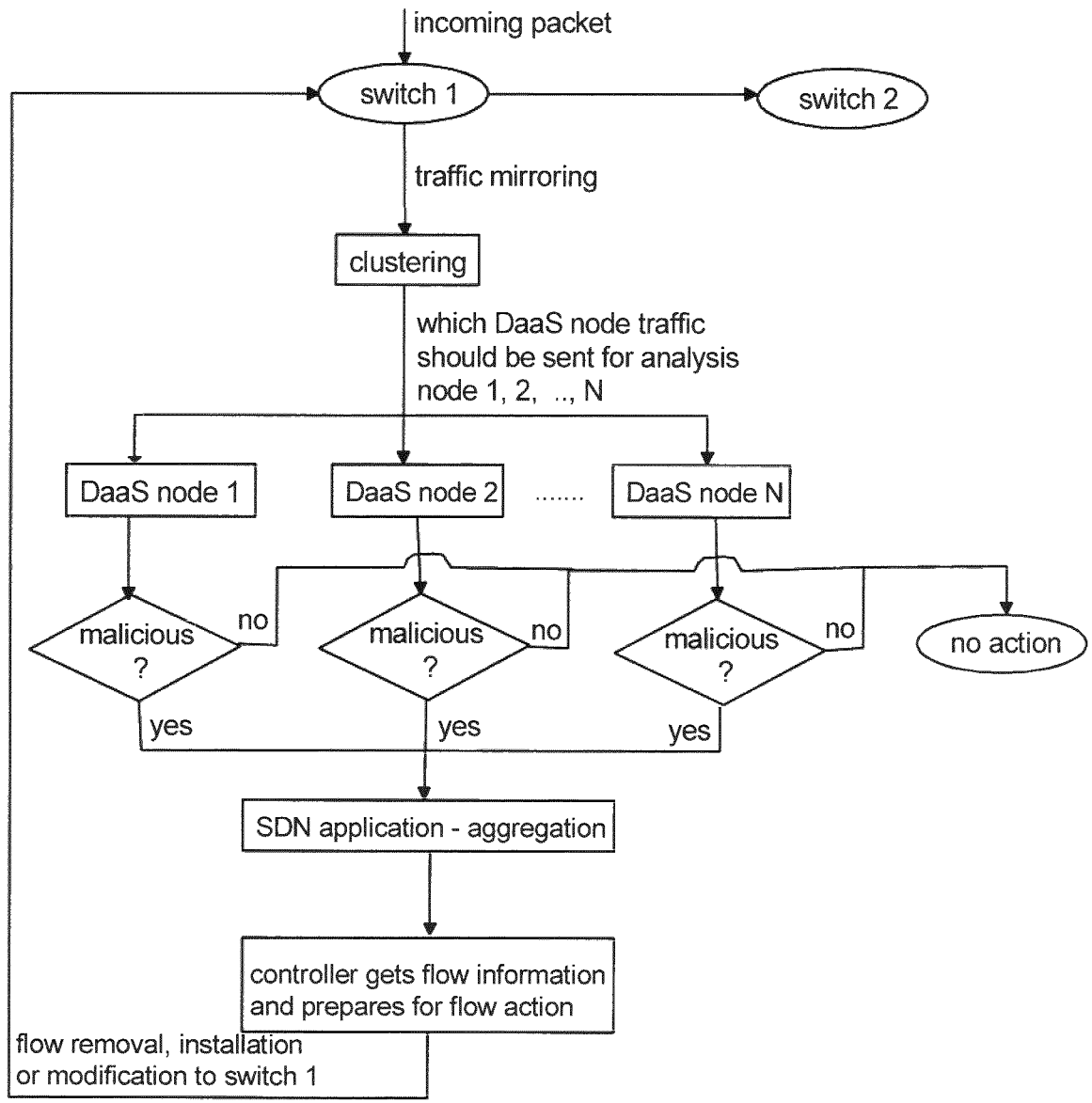
FIG. 5 is a flowchart illustrating anomaly detection according to a first exemplary embodiment.

The SDN node receives (block 207) the decision on maliciousness of the traffic flow from the DaaS node. The SDN node (SDN orchestrator) formulates (block 208) forwarding rule (so called flow in the OpenFlow protocol) information for such traffic. The SDN node (SDN controller) controls (block 209) a switch node to perform at least one flow control action on the traffic flow. The switch node performs (block 210) the flow control action including one or more of flow removal, flow modification and flow installation. The switch node performing the flow control action may be the same switch node (switch 1 in FIG. 4) or a switch node (switch 2 in FIG. 4) different from that where the traffic flow enters the network. In an environment with multiple switches the packet is not coming to the same switch every time; therefore the flow action is to be performed on each of the switches which are connected to an SDN node (SDN controller). The switch node may be configured to define specific flow forwarding rules. The flow forwarding rules may be stored in the forwarding table of the switch node and/or dynamically defined. The flow forwarding rules may be communicated between the SDN node (SDN controller) and the switch node. The SDN orchestrator formulates the forwarding rule information and communicates it to the SDN controller to pass the information to the switch node. But the information is not communicated backwards. The SDN orchestrator has a record of which forwarding rules are active in the switch node(s).

Referring to FIG. 3, in a second embodiment, clustering is carried out on a sampled packet instead of every packet. Input traffic is inspected (block 301) in the switch node. During the inspection, a forwarding table of the switch node may be checked in order to decide whether to pass the traffic flow or drop the traffic flow. If the traffic flow is safe, the switch node sends (block 302) a sample of the traffic flow (i.e. a sampled packet) to a cluster node according to a specified sampling rate. The cluster node defines (block 303) clusters based on the features of the sampled packet, and sends (block 304) cluster information and the sampled packet to a control node. The control node may be an SDN node comprising an SDN controller and/or an SDN application (SDN orchestrator). The SDN node receives (block 305) the cluster information and the sampled packet from the cluster node. The SDN node (SDN orchestrator) formulates (block 306) forwarding rule (so called flow in the OpenFlow protocol) information for the received sampled packet. The SDN node (SDN controller) controls (block 307) a switch node to perform at least one flow control action on the sampled packet. The switch node performs (block 308) the flow control action including one or more of flow removal, flow modification and flow installation.

Figure 6:
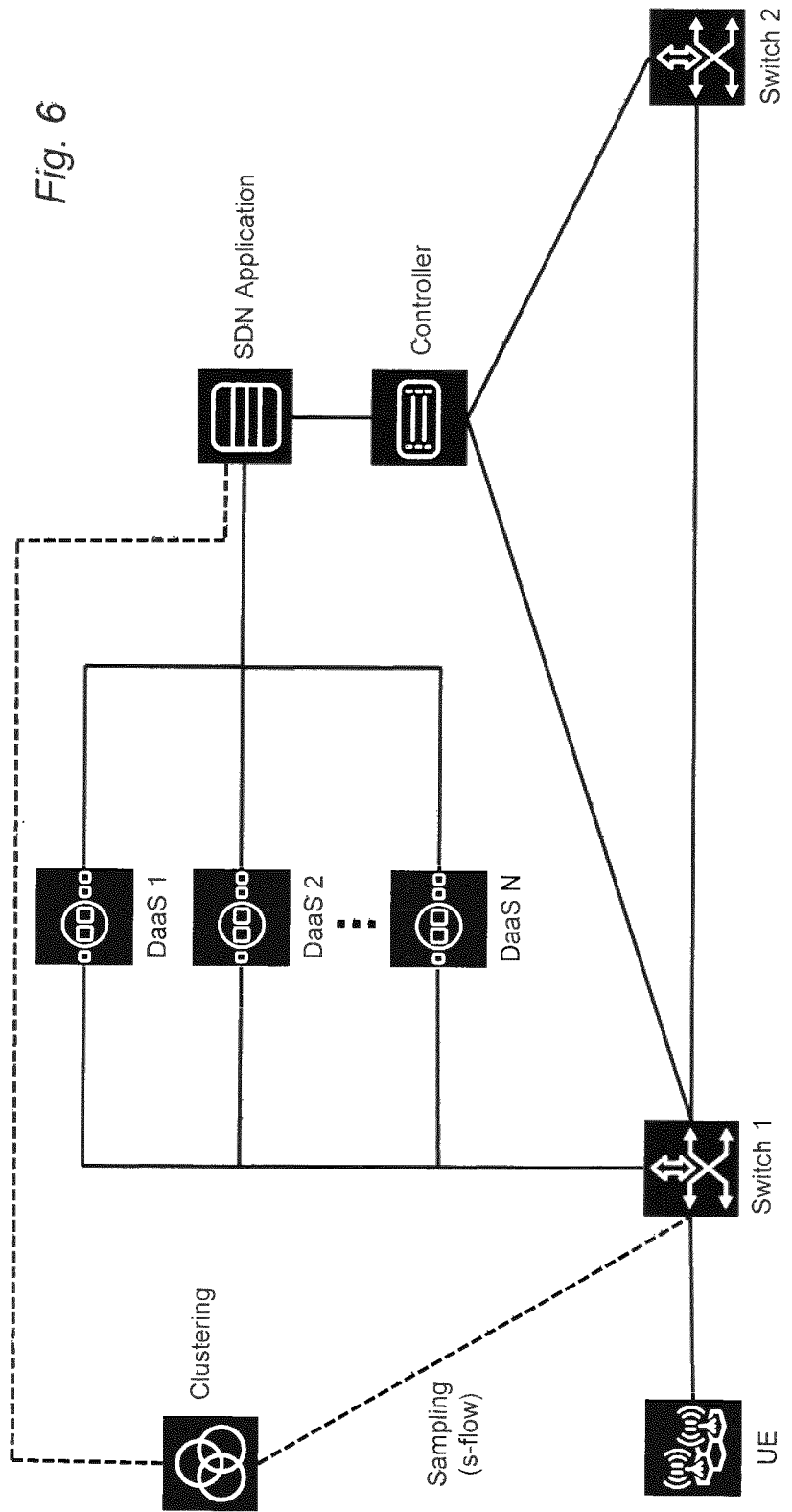
FIG. 6 is a schematic chart illustrating anomaly detection according to a second exemplary embodiment.
Figure 7:
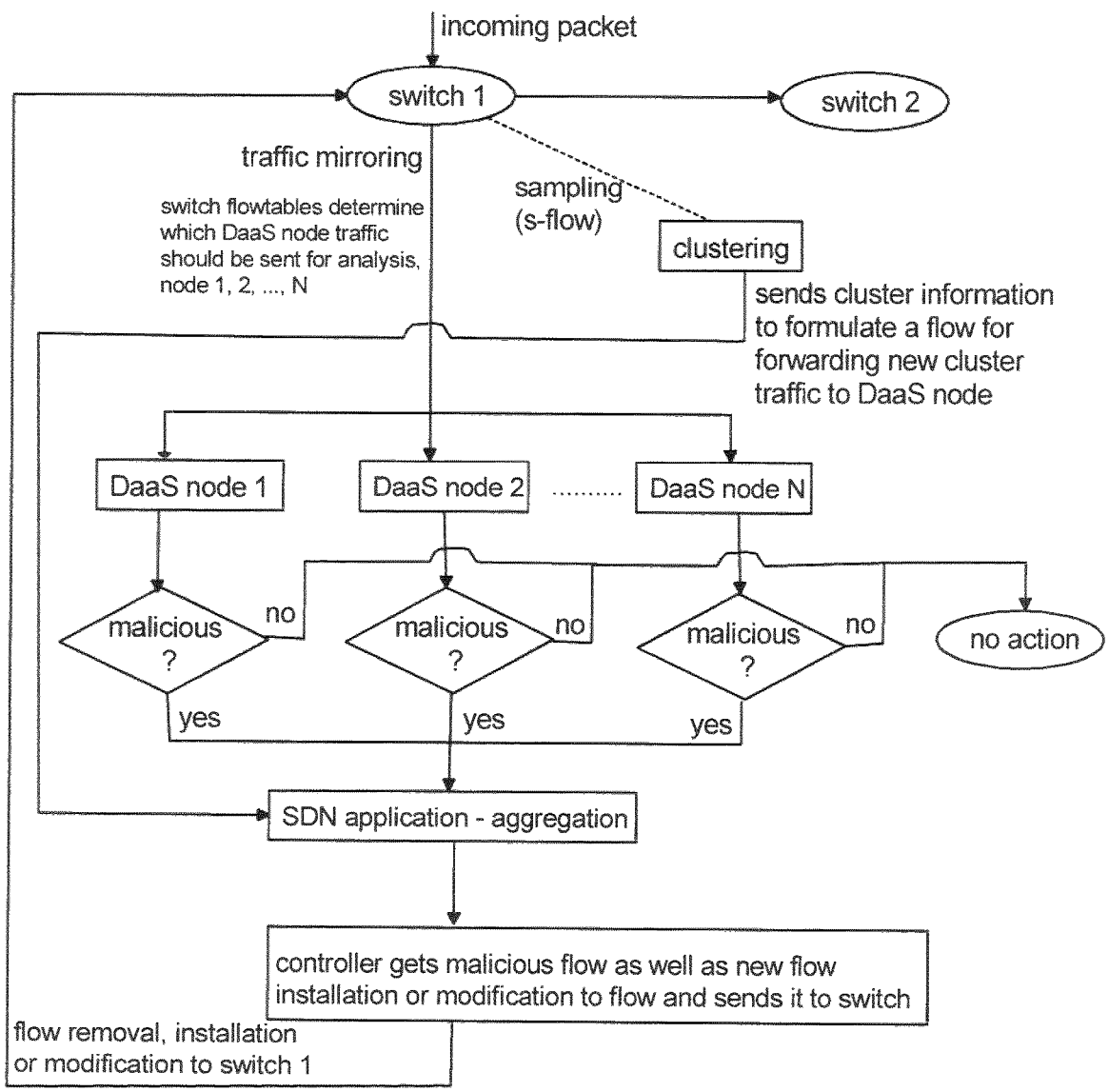
FIG. 7 is a flowchart illustrating anomaly detection according to a second exemplary embodiment.

Input traffic is inspected (block 309) in the switch node. The input traffic contains the sampled packet and also traffic that enters the switch node. During the inspection, a forwarding table of the switch node may be checked in order to decide whether to pass the traffic flow or drop (reject) the traffic flow. If the traffic flow is not rejected, the switch node selects at least one detector node (DaaS node) based on the forwarding table of the switch node. Said packet is then forwarded (block 310) to the selected DaaS node. The DaaS node checks (block 311) whether the said packet is malicious or not. If said packet is malicious, the DaaS node indicates (block 312) the corresponding traffic flow to the SDN node. SDN node receives (block 313) the decision on maliciousness of the traffic flow from the DaaS node, and then the SDN node (SDN orchestrator) formulates (block 314) forwarding rule (so called flow in the OpenFlow protocol) information for such traffic. The SDN node (SDN controller) controls (block 315) a switch node to perform at least one flow control action on the traffic flow. The switch node performs (block 316) the flow control action including one or more of flow removal, flow modification and flow installation. The switch node performing the flow control action may be the same switch node (switch 1 in FIG. 6) or a switch node (switch 2 in FIG. 6) different from that where the traffic flow enters the network.

An embodiment enables detecting anomalies in the data traffic that is to pass through the SDN network, and thus enables preventing malicious traffic from flowing into the SDN network. The malicious traffic may be stopped from entering further and polluting the network elements. SDN is a programmable network, and the forwarding tables for the switches (switch nodes) may be programmed and managed by the SDN controller. The anomalies in the network traffic are detected by means of a detection as a service (DaaS) unit which may also be referred to as a DaaS node or detector node. Considering the amount of network traffic and the computation requirements, various DaaS units may be utilized for load balancing and/or mitigation purposes.

In an embodiment, forwarding tables (flow tables) of the switch node, combined with the clustering of the DaaS units, may be used to identify in the cluster node which traffic flow belongs to which DaaS unit(s), and a decision is made to forward certain types of traffic flows to respective DaaS nodes for traffic analysis. Any clustering algorithm with unsupervised learning may be used, and the number of clusters does not need to specified in advance.

In an embodiment, traffic mirroring may be used, wherein a copy of the data packet is analysed in the DaaS node. The DaaS node analyses the traffic flow by analysing the copy of the packet, and based on that concludes whether the traffic flow is malicious or not. If the traffic flow is malicious, then the DaaS node informs the SDN orchestrator accordingly.

The SDN orchestrator gathers results from multiple DaaS nodes, and formulates a flow that is sent to the SDN controller. The SDN controller then instructs the switch node to perform actions including removal, modification and/or installation of the traffic flow, and thus anomaly traffic flow does not pass through the switch node and is dropped by the switch node.

Unless the traffic has been detected as malicious in the DaaS node, the traffic is flowing normally. As soon as the traffic flow is detected as malicious, a flow removal procedure is initiated, and then such traffic flow is not forwarded. The malicious traffic flow still enters the switch node where the copying/sampling to the DaaS node happens, but the flow is not being forwarded. In order to fully prevent the malicious flow from entering the switch node an additional filtering element may be needed somewhere earlier on the traffic path.

In an embodiment, the anomalies may be detected in the traffic flow independently, without pre-defined data or initial data. Rather than sampling traffic, each data packet or sampled packet is analysed. The analysis on the traffic flow is not carried in line, but rather the traffic mirroring is used. This enables detecting malicious traffic in the network, and reverting and stopping the malicious traffic from reaching the network elements in SDN. When a first (or any consequent) packet arrives into the switch node, the packet is mirrored into a clustering system and forwarded normally towards its destination. Based on clustering (for the purpose of load balancing or based on some other criteria) the mirrored packet is forwarded for analysis to a corresponding DaaS node. The DaaS node analyses and decides whether the traffic is malicious traffic or normal (i.e. non-malicious) traffic. If the DaaS node tags the traffic as malicious, the DaaS node informs the SDN controller via the SDN orchestrator that the traffic flow needs to be blocked. The SDN orchestrator directs the SDN controller to do the blocking. The SDN controller inserts the blocking flow entry to the switch node, and the switch node blocks the flow.

In the first embodiment, the input traffic is mirrored to the cluster node only; therefore there is only one rule for forwarding the traffic. In the second embodiment, based on the clustering results, the SDN controller informs the switch node about several rules on whether the traffic is to be forwarded to which DaaS unit(s); therefore the switch node carries several forwarding rules.

These two example embodiments involve different cluster determinations. Unless the traffic has been detected as malicious in a DaaS node, the traffic is flowing normally. As soon as the traffic is detected as malicious, flow actions (i.e. flow removal, installation and/or modification) are initiated and then such malicious traffic flow is dropped and not forwarded in the network.

In the first embodiment, the cluster node performs load balancing and decides to which DaaS node the copied packet is to be forwarded for anomaly inspection. Each packet is copied and the copy is checked to detect the traffic type of the packet, e.g. traffic type x where x refers to any traffic type/group/cluster that may be defined based on features of the packet. For example, if the packet comes from a specific IP address, then the packet is to be classified to traffic type/group/cluster x. If, for example, the cluster x is defined to belong to a DaaS node DaaS1 (or DaaS2, DaaS3, . . . , DaaSN), then the packet copy is forwarded to DaaS1 (or DaaS2, DaaS3, . . . , DaaSN) for inspection. The inspection results of the DaaS unit are delivered from the DaaS unit to the SDN orchestrator that correlates and removes any redundant and/or duplicate information. The SDN orchestrator delivers instructions (flow information) to the SDN controller, instructing the SDN controller to define required flow action (flow removal, flow installation and/or flow modification). The SDN controller delivers instructions (flow information) to the switch node to perform the required flow action (flow removal, flow modification or flow installation), so that suspicious and/or potentially malicious traffic is not forwarded. FIGS. 2, 4, 5, 8, 9, 10 and 11 illustrate the first embodiment.

In the second embodiment, the procedure is distributed to multiple elements for load balancing and latency minimization purposes, and may be referred as adaptive cluster creation. In the adaptive cluster creation, the cluster node along with the SDN orchestrator and the SDN controller, provide forwarding strategy to select the respective DaaS node. A sample of the traffic flow (using sampled flow, s-flow), i.e. every Nth packet where N is the sampling rate, is fed to the cluster node. The cluster node defines (roughly) even-sized clusters for different features, wherein a cluster is defined based on a set of features which are extracted from input traffic. Packets belonging to one cluster have similar features but dissimilar to the features of other clusters. A cluster may cover either one or several DaaS node(s). The defined cluster information is delivered to the SDN orchestrator. From the clusters the SDN orchestrator formulates forwarding rules (flow forwarding rules) for different DaaS nodes for load balancing. The SDN orchestrator forwards the flow forwarding rules to the SDN controller. The SDN controller deploys or installs the respective flow forwarding rules in the switch node (switch 1 in FIGS. 6 and 7), so that the traffic flows matching the flow forwarding rules are forwarded to the respective DaaS nodes. Eventually, the traffic flows to the different DaaS nodes (roughly) evenly. The traffic analysis is performed as follows. If the DaaS node detects that a packet is suspicious, then the detecting DaaS node informs the SDN orchestrator. The SDN orchestrator sends traffic flow information to the SDN controller (rather than packet itself or the decision whether such packet is suspicious). A reason to send flow information is that the SDN controller is able to interpret the flow information, and does not need to process the flow information further. Further flow information on subsequent packets may be sent from the DaaS node to the SDN orchestrator that correlates and removes any redundant and/or duplicated information, and sends instructions (flow information) to the SDN controller to initiate necessary flow actions (flow removal, installation and/or modification). The SDN controller instructs the switch node to perform the flow actions (flow removal, modification and/or installation), so that suspicious and/or potentially malicious traffic is not forwarded in the network. Thus, the abnormal traffic is stopped before it reaches the network elements. The SDN controller instructs a switch node to remove malicious flows. The SDN controller also includes or interacts with a load balancer or clustering unit to help to reduce the load. FIGS. 3, 6, 7, 12, 13, 14 and 15 illustrate the second embodiment.

Figure 8:
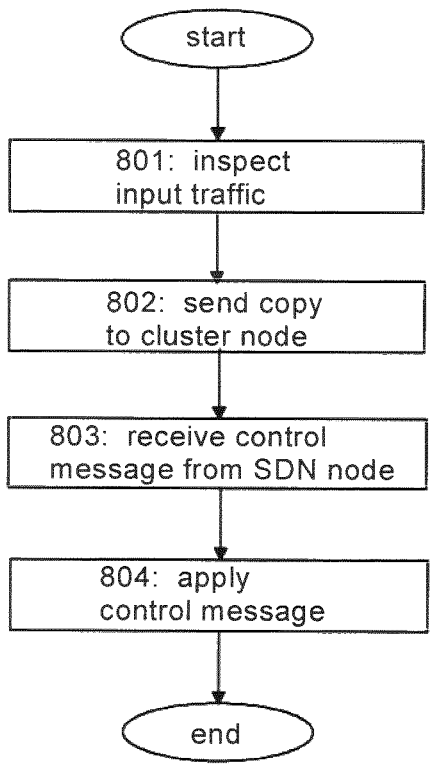
FIGS. 8, 9, 10, 11, 12, 13, 14 and 15 illustrate exemplary embodiments.

FIG. 8 is a flowchart illustrating the functioning of the switch node according to the first embodiment. In FIG. 8, input traffic entering a switch node is inspected (block 801) in the switch node. During the inspection, a forwarding table of the switch node may be checked in order to decide whether to pass a traffic flow or drop the traffic flow. If the traffic flow is safe, the switch node provides (block 802) a copy of a packet contained in the traffic flow to a cluster node. The switch node receives (block 803) a control message from a control node, and based on the receiving performs (block 804) the flow control action including one or more of flow removal, flow modification and flow installation. The switch node performing the flow control action may be the same switch node (switch 1 in FIG. 4) or a switch node (switch 2 in FIG. 4) different from that where the traffic flow enters the network. In an environment with multiple switches the packet is not coming to the same switch every time; therefore the flow action is to be performed on each of the switches which are connected to an SDN node (SDN controller). The switch node may be configured to define (block 804) specific flow forwarding rules. The flow forwarding rules may be stored in the forwarding table of the switch node and/or dynamically defined. It is also possible that the flow forwarding rules are received (block 803) from the SDN node (SDN controller).

Figure 9:
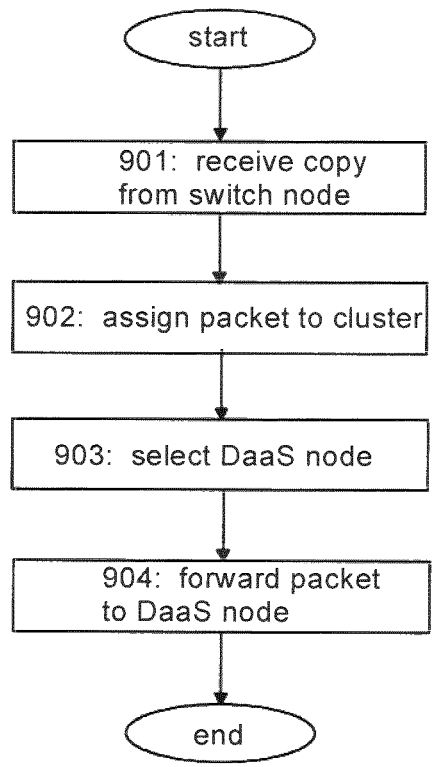

FIG. 9 is a flowchart illustrating the functioning of the cluster node according to the first embodiment. In FIG. 9, the cluster node assigns (block 902) a packet to one or more detector nodes (DaaS nodes) based on the features of a packet copy received (block 901) in the cluster node from a switch node. Said copy is forwarded (block 904) from the cluster node to a DaaS node selected (block 903) in the cluster node among one or more DaaS nodes.

Figure 10:
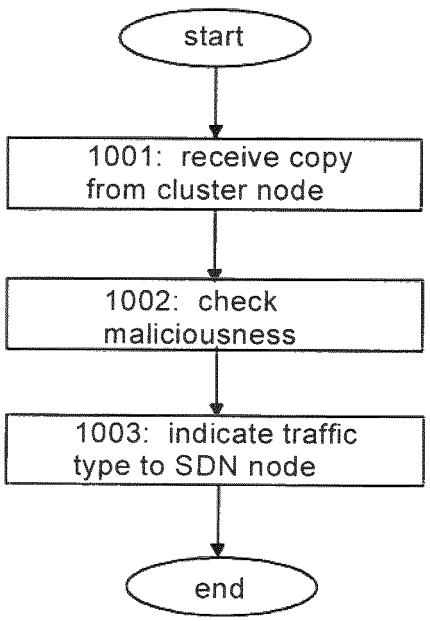

FIG. 10 is a flowchart illustrating the functioning of the detector node (DaaS node) according to the first embodiment. In FIG. 10, the DaaS node checks (block 1002) whether a packet copy received (block 1001) from a cluster node, is malicious or not. If said copy is malicious, the DaaS node indicates (block 1003) the corresponding traffic flow to a control node.

Figure 11:
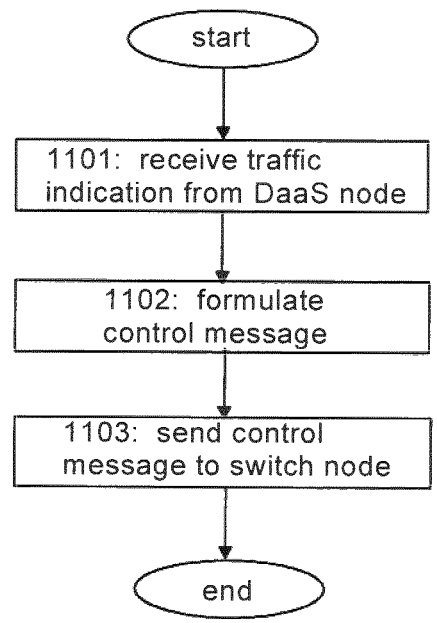

FIG. 11 is a flowchart illustrating the functioning of the control node (SDN node) according to the first embodiment. The control node may be an SDN node comprising an SDN controller and/or an SDN application (SDN orchestrator). In FIG. 11, the SDN node receives (block 1101) a decision on maliciousness of a traffic flow from a DaaS node. The SDN node (SDN orchestrator) formulates (block 1102) forwarding rule (so called flow in the OpenFlow protocol) information for such traffic. The SDN controller controls (block 1103) a switch node to perform at least one flow control action on the traffic flow. Flow forwarding rules may be communicated (block 1103) from the SDN controller to the switch node. The SDN orchestrator formulates (block 1102) the forwarding rule information and communicates the information to the SDN controller to pass (block 1103) the information to the switch node. The SDN orchestrator may maintain a record on which forwarding rules are active in the switch node(s).

Figure 12:
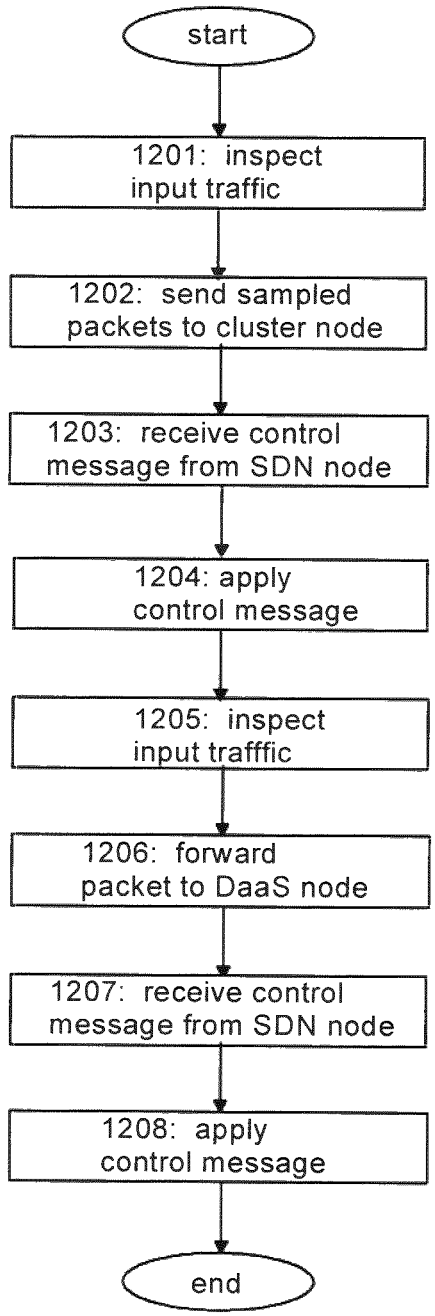

FIG. 12 is a flowchart illustrating the functioning of the switch node according to the second embodiment. In the second embodiment, clustering is carried out on a sampled packet instead of every packet. In FIG. 12, input traffic is inspected (block 1201) in the switch node. During the inspection, a forwarding table of the switch node may be checked in order to decide whether to pass the traffic flow or drop the traffic flow. If the traffic flow is safe, the switch node sends (block 1202) the sampled packet to the cluster node according to a specified sampling rate. The switch node receives (block 1203) a control message from the the SDN node (SDN controller), controlling the switch node to perform (block 1204) at least one flow control action on the sampled packet. The switch node performs (block 1204) the flow control action including one or more of flow removal, flow modification and flow installation. Input traffic is inspected (block 1205) in the switch node. The input traffic contains the sampled packet and also traffic that enters the switch node. During the inspection, a forwarding table of the switch node may be checked in order to decide whether to pass the traffic flow or drop (reject) the traffic flow. If the traffic flow is not rejected, the switch node selects at least one detector node (DaaS node) based on the forwarding table of the switch node, and said packet is then forwarded (block 1206) to the selected DaaS node. The switch node receives (block 1207) a control message from the SDN node (SDN controller), controlling the switch node to perform at least one flow control action on the traffic flow. The switch node performs (block 1208) the flow control action including one or more of flow removal, flow modification and flow installation. The switch node performing the flow control action may be the same switch node (switch 1 in FIG. 6) or a switch node (switch 2 in FIG. 6) different from that where the traffic flow enters the network.

Figure 13:
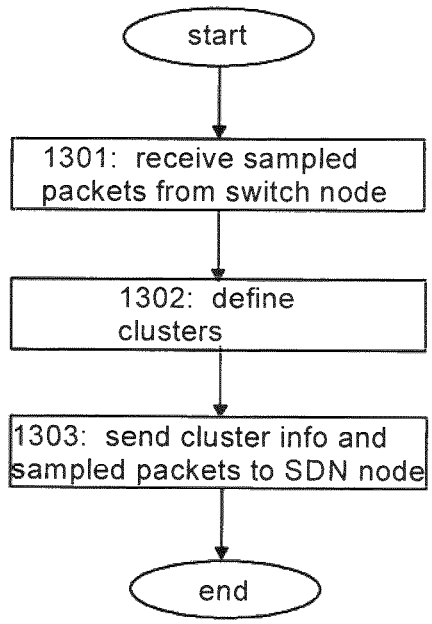

FIG. 13 is a flowchart illustrating the functioning of the cluster node according to the second embodiment. In FIG. 13, the cluster node receives (block 1301) the sampled packet from the switch node, based on the receiving defines (block 1302) clusters based on the features of the sampled packet, and sends (block 1303) cluster information and the sampled packet to the control node.

Figure 14:
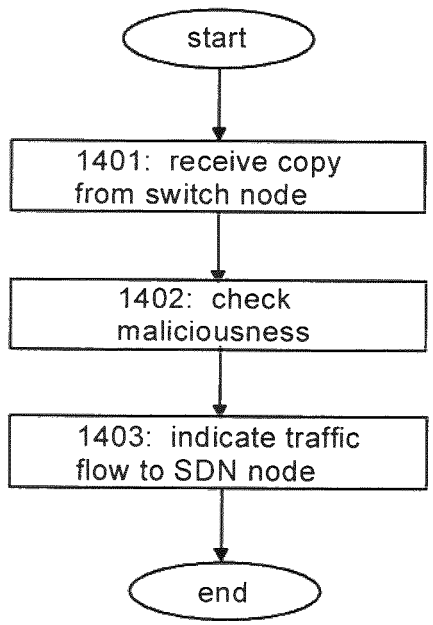

FIG. 14 is a flowchart illustrating the functioning of the detector node (DaaS node) according to the second embodiment. In FIG. 14, a packet copy is received (block 1401) in the DaaS node. The DaaS node checks (block 1402) whether the said packet is malicious or not. If said packet is malicious, the DaaS node indicates (block 1403) the corresponding traffic flow to the SDN node.

Figure 15:
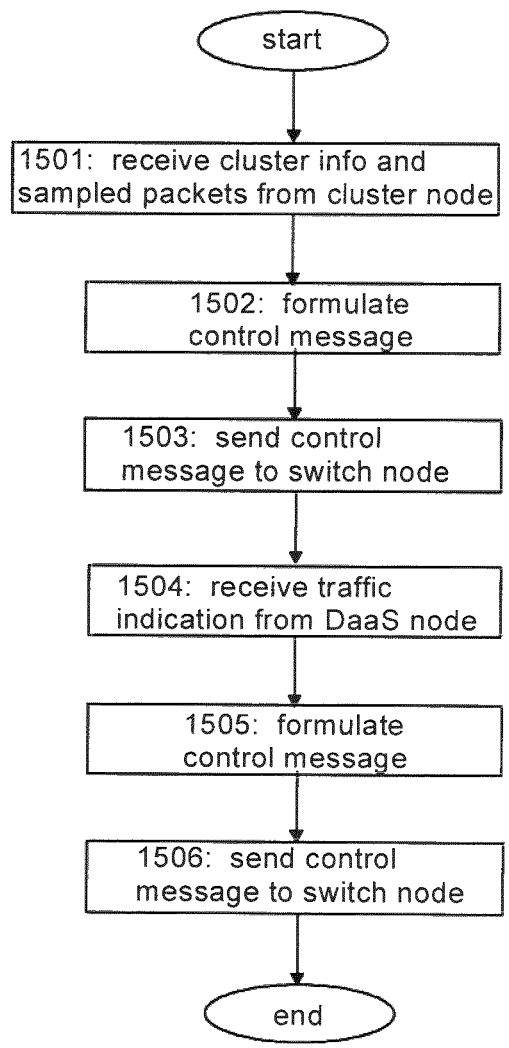

FIG. 15 is a flowchart illustrating the functioning of the control node (SDN node) according to the second embodiment. The control node may be an SDN node comprising an SDN controller and/or an SDN application (SDN orchestrator). In FIG. 15, the SDN node receives (block 1501) cluster information and the sampled packet from the cluster node. The SDN node (SDN orchestrator) formulates (block 1502) forwarding rule (so called flow in the OpenFlow protocol) information for the received sampled packet. The SDN node (SDN controller) controls (block 1503) the switch node to perform at least one flow control action on the sampled packet. The SDN node receives (block 1504), from the DaaS node, a traffic indication sent based on a malicious packet, i.e. the SDN node receives the decision on maliciousness of the traffic flow from the DaaS node. Then the SDN node (SDN orchestrator) formulates (block 1505) forwarding rule (so called flow in the OpenFlow protocol) information for such traffic. The SDN node (SDN controller) controls (block 1506) the switch node to perform at least one flow control action on the traffic flow.

An embodiment may be implemented in a cloud computing environment. However, an embodiment may also be applicable to a non-cloud based network environment. For example, any SDN enabled communications network may be utilized (cloud based or non-cloud based).

Figure 16:
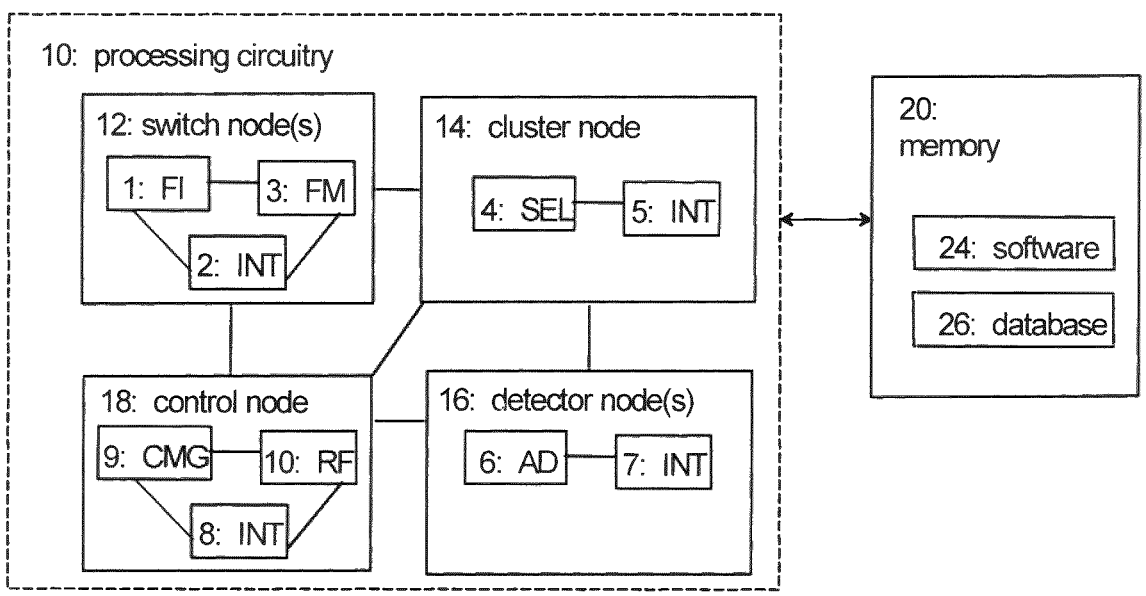
FIG. 16 illustrates a block diagram of apparatuses according to an embodiment.

An embodiment provides at least one apparatus comprising at least one processor and at least one memory including a computer program code, wherein the at least one memory and the computer program code are configured, with the at least one processor, to cause the apparatus to carry out the procedures of the above-described control node, cluster node, switch node, and/or detector node. The at least one processor, the at least one memory, and the computer program code may thus be considered as an embodiment of means for executing the above-described procedures of the control node, cluster node, switch node, and/or detector node. FIG. 16 illustrates a block diagram of a structure of such an apparatus. The apparatus may be comprised in at least one network element or network node, e.g. the apparatus may form a chipset or a circuitry in the network element or in the network node. In some embodiments, the apparatus is the network element or the network node.

The apparatus comprises a processing circuitry 10 comprising the at least one processor. The processing circuitry 10 may comprise or be connected to at least one switch node 12 comprising a flow inspector 1 configured to classify traffic flows containing packets based on packet features. The switch node 12 may comprise an interface 2 configured to provide to a cluster node 14 a copy of a packet contained in a traffic flow or a sampled packet, and a flow modifier 3 configured to perform at least one flow control action on the traffic flow, the action including one or more of flow removal, flow modification and flow installation. The processing circuitry 10 may comprise or be connected to a cluster node 14 comprising a DaaS selector 4 configured to check a copy of a packet or a sampled packet obtained from a switch node 12, and select at least one detector node 16 among one or more detector nodes 16 capable of checking whether a packet is malicious or not. The cluster node 14 may comprise an interface 5 configured to forward said copy to the selected detector node 16, or send cluster information to a control node 18. The processing circuitry 10 may comprise or be connected to a detector node 16 comprising an anomaly detector 6 configured to check whether a packet is malicious or not. The detector node 16 may comprising an interface 7 configured to, if the packet is malicious, indicate a corresponding traffic flow to a control node 18. The processing circuitry 10 may comprise or be connected to a control node 18 comprising an interface 8 configured to receive a flow indication on a traffic flow. The control node 18 may comprise a control message generator 9 configured to send a control message to a switch node 12, controlling the switch node 12 to perform at least one flow control action on the traffic flow, the action including one or more of flow removal, flow modification and flow installation. The control node 18 may further comprise a rule formulator 10 configured to define a flow forwarding rule.

The processing circuitry 10 may comprise the circuitries 12, 14, 16 and 18 as sub-circuitries, or they may be considered as computer program modules executed by the same physical processing circuitry. The memory 20 may store one or more computer program products 24 comprising program instructions that specify the operation of the circuitries 12 to 18. The memory 20 may further store a database 26 comprising definitions for flow forwarding rules, for example. The apparatus may further comprise a radio interface (not shown in FIG. 16) providing the apparatus with radio communication capability with the network nodes or terminal devices. The radio interface may comprise a radio communication circuitry enabling wireless communications and comprise a radio frequency signal processing circuitry and a baseband signal processing circuitry. The baseband signal processing circuitry may be configured to carry out the functions of a transmitter and/or a receiver. In some embodiments, the radio interface may be connected to a remote radio head comprising at least an antenna and, in some embodiments, radio frequency signal processing in a remote location with respect to a base station. In such embodiments, the radio interface may carry out only some of radio frequency signal processing or no radio frequency signal processing at all. The connection between the radio interface and the remote radio head may be an analogue connection or a digital connection. In some embodiments, the radio interface may comprise a fixed communication circuitry enabling wired communications.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or to processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described above in connection with FIGS. 1 to 16 may also be carried out in the form of one or more computer process defined by one or more computer programs. The computer program shall be considered to encompass also a module of a computer programs, e.g. the above-described processes may be carried out as a program module of a larger algorithm or a computer process. The computer program(s) may be in source code form, object code form, or in some intermediate form, and it may be stored in a carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular or mobile communication systems defined above but also to other suitable communication systems. The protocols used, the specifications of cellular communication systems, their network elements, and terminal devices develop rapidly. Such development may require extra changes to the described embodiments. Therefore, all words and expressions should be interpreted broadly and they are intended to illustrate, not to restrict, the embodiment.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS 3G 3rd Generation
3GPP 3rd Generation Partnership Project
5G 5th Generation
ASIC Application Specific Integrated Circuit
CPU Central Processing Unit
DaaS Detection as a Service
DC Dual Connectivity
DDoS Distributed Denial of Service DoS Denial of Service
eNB Evolved Node B
EPC Evolved Packet Core
FGPA Field Programmable Grid Array
HSPA High Speed Packet Access
ICMP Internet Control Message Protocol
IDS Intrusion Detection System
IP Internet Protocol
IPS Intrusion Prevention System
LTE Long Term Evolution
LTE-A Long Term Evolution-Advanced
MIMO Multiple Input Multiple Output
MME Mobility Management Entity
MTC Machine Type Communications
NFV Network Functions Virtualization
RAT Radio Access Technology
SAE-GW System Architecture Evolution-Gateway
SDN Software Defined Networking
TCAM Ternary Content Addressable Memory
UDP Universal Datagram Protocol
UMTS Universal Mobile Telecommunication System
VM Virtual Machine
VNF Virtual Network Function
W-CDMA Wideband Code Division Multiple Access

The invention claimed is:

1. A method comprising performing, in a network apparatus, the steps of
classifying traffic flows containing packets based on packet features; providing a copy of a packet contained in a traffic flow to a cluster node;
controlling the cluster node to select at least one detector node based on the features of the packet and to forward said copy to the selected detector node to find out based on said copy whether the packet is malicious or not; and
in response to receiving from the detector node a flow indication on the traffic flow, controlling a switch node to perform at least one flow control action on the traffic flow, the action including one or more of flow removal, flow modification and flow installation.

2. A method as claimed in claim 1, wherein the method comprises
dynamically defining or obtaining one or more traffic flow forwarding rules, wherein a traffic flow forwarding rule includes information for
determining traffic flow type based on the features, and
selecting one or more detector nodes for the traffic flow based on the features;
wherein said defining or obtaining is carried out in at least one of the control node and the cluster node.

3. A method as claimed in claim 2, wherein the traffic flow forwarding rule comprises information obtained from a switch node.

4. A method as claimed in claim 1, wherein the method comprises
determining traffic flow type based on at least one feature of the packet, such as the packet being sent from a specific IP address, the packet being sent to a specific port, the packet being sent to a specific URL, or some other packet feature.

5. A method as claimed in claim 1,
wherein the control node comprises at least one of an SDN controller and an SDN orchestrator.

6. An apparatus comprising
at least one processor; and
at least one memory including a computer program code, wherein the at least one memory and the computer program code are configured, with the at least one processor, to cause the apparatus to perform the method steps of claim 1.

7. A communications system comprising at least one apparatus according to claim 6.

8. A computer program product stored on a non-transitory distribution medium readable by a computer and comprising program instructions which, when loaded into an apparatus, execute the method according to claim 1.

9. A method comprising performing, in a network apparatus, the steps of
obtaining a copy of a packet contained in a traffic flow from a switch node;
checking packet features;
selecting, based on the packet features, at least one detector node among one or more detector nodes capable of checking based on said copy whether the packet is malicious or not; and
forwarding said copy to the selected detector node for checking whether the packet is malicious or not.

10. An apparatus comprising:
at least one processor; and
at least one non-transitory memory including a computer program code, wherein the at least one memory and the computer program code are configured, with the at least one processor, to:
cause the apparatus to perform the method of claim 9.

11. A method comprising performing, in a network apparatus, the steps of
classifying traffic flows containing packets based on packet features;
providing a sample of a traffic flow to a cluster node;
receiving, from the cluster node, information on one or more detector nodes selected in the cluster node for features of the sample;
controlling a switch node to forward the traffic flow based on rules extracted from the cluster node to the selected detector node to find out whether a packet contained in said traffic flow is malicious or not; and
in response to receiving, from the detector node, a flow indication on the traffic flow, controlling the switch node to perform at least one flow control action on the traffic flow, the action including one or more of flow removal, flow modification and flow installation.

12. A method as claimed in claim 11, wherein the method comprises
performing load balancing and/or latency mitigation by distributed anomaly detection in multiple detector nodes.

13. A method as claimed in claim 11, wherein the method comprises distributing input traffic roughly evenly between multiple detector nodes.

14. An apparatus comprising:
at least one processor; and
at least one non-transitory memory including a computer program code, wherein the at least one memory and the computer program code are configured, with the at least one processor, to:
cause the apparatus to perform the method of claim 11.

15. A method comprising performing, in a network apparatus, the steps of
obtaining a sample of a traffic flow from a switch node;
checking features of the sample;
based on the checking, selecting at least one detector node among one or more detector nodes capable of checking whether a packet is malicious or not; and indicating to a control node the at least one detector node selected for traffic flow anomaly detection.

16. An apparatus comprising:
at least one processor; and
at least one non-transitory memory including a computer program code, wherein the at least one memory and the computer program code are configured, with the at least one processor, to:
cause the apparatus to perform the method of claim 15.

* * * * *